(12) United States Patent
Sporrong et al.

(10) Patent No.: US 6,510,388 B1
(45) Date of Patent: Jan. 21, 2003

(54) SYSTEM AND METHOD FOR AVOIDANCE OF COLLISION BETWEEN VEHICLES

(75) Inventors: Jonas Sporrong, Göteborg (SE); Peter Uhlin, Linköping (SE)

(73) Assignee: Saab AB, Linkoping (SE)

( * ) Notice: Subject to any disclaimer, the term of this patent is extended or adjusted under 35 U.S.C. 154(b) by 0 days.

(21) Appl. No.: 10/174,232

(22) Filed: Jun. 18, 2002

(51) Int. Cl.$^7$ .................................................. G06G 7/78
(52) U.S. Cl. ........................................ 701/301; 342/455
(58) Field of Search ................................. 701/301, 300, 701/213, 212, 209, 302; 342/455

(56) References Cited

U.S. PATENT DOCUMENTS

| | | | |
|---|---|---|---|
| 5,325,302 A | | 6/1994 | Izidon et al. |
| 5,596,332 A | | 1/1997 | Coles et al. |
| 6,430,506 B1 | * | 8/2002 | Mon et al. ................... 701/301 |
| 6,442,484 B1 | * | 8/2002 | Miller et al. ................ 701/301 |
| 6,445,310 B1 | * | 9/2002 | Bateman et al. ............ 701/301 |

FOREIGN PATENT DOCUMENTS

WO    WO9605562 A1    2/1996

* cited by examiner

Primary Examiner—Richard M. Camby
(74) Attorney, Agent, or Firm—Carter, DeLuca, Farrell & Schmidt LLP

(57) ABSTRACT

A system and a method for avoidance of collision between vehicles, wherein a possible avoidance manoeuvre trajectory for the respective vehicle is calculated and compared with the avoidance manoeuvre trajectories calculated for the other vehicles for controlling whether the avoidance manoeuvre trajectory of the vehicle in every moment during its calculated lapse is located at a stipulated or predetermined minimum distance from the avoidance manoeuvre trajectories of the other vehicles. A warning is presented to a person manoeuvring the vehicle and/or the vehicle is made to follow an avoidance manoeuvre trajectory previously calculated and stored for the vehicle if the comparison shows that the avoidance manoeuvre trajectory of a vehicle in any moment during its calculated lapse is located at a distance from the avoidance manoeuvre trajectories of any of the other vehicles that is smaller than the stipulated minimum distance.

12 Claims, 3 Drawing Sheets

SYSTEM AND METHOD FOR AVOIDANCE OF COLLISION BETWEEN VEHICLES

PRIORITY

This application claims priority to a PCT Application filed on Dec. 8, 2000 and assigned Application No. PCT/SE00/02467 which was published on Jun. 28, 2001 and assigned International Publication No. WO 01/46933 A1; the PCT Application claims priority to an application filed in Sweden on Dec. 22, 1999 and assigned Application No. 9904717-7, the contents of both applications are incorporated herein by reference.

BACKGROUND OF THE INVENTION

1. Field of the Invention

The invention relates to a system and a method for avoidance of collision between vehicles.

2. Description of the Related Art

Collisions between fighting airplanes during air combat training is frequently occurring and are normally caused by a pilot lacking of attention, for instance due to attention being directed to radar reconnaissance or weapon adjustments. These collisions cause costly losses in the form of crashed fighting airplanes and, in the worst case, result in the loss of life of an involved pilot. Consequently, there is a great need of a reliable system for collision avoidance.

Conventional collision avoidance systems are based on the idea to calculate the trajectories of the involved airplanes and predict a risk of collision with the aid thereof. Such a collision avoidance system, which primarily has been developed and used for civil air traffic, is known under the denomination TCAS ("Traffic alert and Collision Avoidance System"). Each airplane included by this system is provided with its own TCAS-device comprising inter alia a radio transponder. The radio transponder continuously transmits a radio signal and a radio transponder in another airplane, when receiving this radio signal, transmits a reply signal comprising data concerning the height of flight of the own airplane. The distance to the other airplane is obtained by measuring the time between transmitted and received signal and the bearing is obtained by means of a radio direction finder. By means of these values the TCAS-device continuously calculates and updates the flight trajectories for the TCAS-equipped airplanes located in the surroundings. If a flight trajectory calculated for another airplane is estimated to cross the planned flight trajectory of the own airplane, a warning is generated to the pilot at a moment with a predetermined time interval up to a so called "Closest Point of Approach".

TCAS II is a further developed system which besides giving the pilot a warning also suggests an avoidance manoeuvre direction. The avoidance manoeuvre directions are co-ordinated between the involved airplanes via radio link. TCAS gives a bad accuracy in the bearing values and many warnings are generated even when the airplanes can pass each other without any risk of collision.

A collision avoidance system that gives many superfluous warnings implies an additional stress factor for the pilot, which is particularly inconvenient in air combat training when the pilot has a very high work load with many instruments and a large amount of data to handle under great pressure. During air combat training with flight manoeuvres that are difficult to predict and a close contact between the involved airplanes, the risk of superfluous warnings is as well larger than in commercial aviation.

OBJECT OF THE INVENTION

An object of the present invention is to provide a system and a method for collision avoidance, particularly for use in fighting airplanes, by means of which collisions between vehicles can be averted with a high reliability at the same time as collision warnings and/or automatic avoidance manoeuvres are avoided to the utmost possible extent in the situations when the vehicles located in the vicinity of each other have a possibility to pass each other without any risk of collision.

SUMMARY OF THE INVENTION

The system and the method according to the invention are based on the strategy to seek for a possible avoidance manoeuvre for the respective vehicle and present a warning to a person manoeuvring the vehicle and/or automatically execute the suitable avoidance manoeuvre just before the possibility to perform this avoidance manoeuvre disappears, i.e. just before the involved vehicles are in such a position in relation to each other that a collision cannot be avoided with a satisfactory security. The collision avoidance system according to the invention is consequently restricted and a warning is generated and/or an automatic avoidance manoeuvre is performed only in case of an immediate risk of collision.

According to a preferred embodiment of the invention, a calculated avoidance manoeuvre trajectory is represented by a number of three dimensional objects, such as spheres, each of which objects being assigned a certain time value, the dimension of the separate objects being dependent on the stipulated minimum distance between the avoidance manoeuvre trajectories. In this connection, it is controlled whether any of the geometrical object representing the avoidance manoeuvre trajectory of the vehicle is overlapping a geometrical object with corresponding time value included in the representation of the avoidance manoeuvre trajectories of any of the other vehicles. In this way it becomes possible to control in an easy way whether the calculated avoidance manoeuvre trajectories are located to close to each other.

By making the dimension of the geometrical objects depend also on estimated errors of the calculated avoidance manoeuvre trajectories, an improved security against collisions caused by miscalculations is obtained.

According to a preferred embodiment of the invention, the avoidance manoeuvre direction for the respective vehicle is determined based on the criteria that the completion points of the avoidance manoeuvre trajectories of the vehicles are to be at as large a distance from each other as possible. In this way, the appropriate avoidance manoeuvre directions can be calculated by means of a relatively simple model of calculation.

BRIEF DESCRIPTION OF THE DRAWINGS

With reference to the drawings, the invention will hereinbelow be more closely described by means of embodiment examples. It is shown in.

DETAILED DESCRIPTION OF PREFERRED EMBODIMENTS

Figure 1:
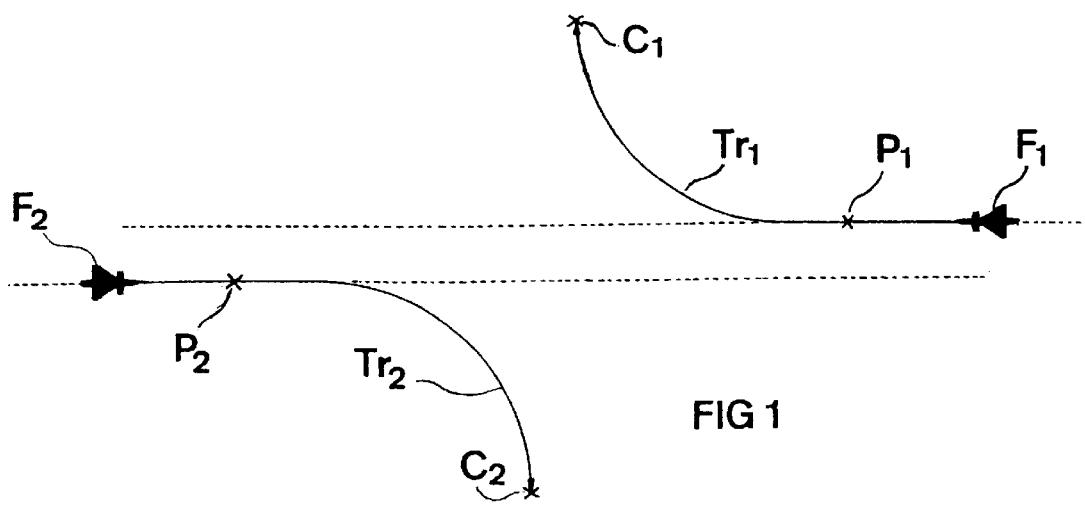
FIG. 1 schematically illustrates two airplanes equipped with a system according to the invention and an avoidance manoeuvre trajectory calculated for the respective airplane.
Figure 2:
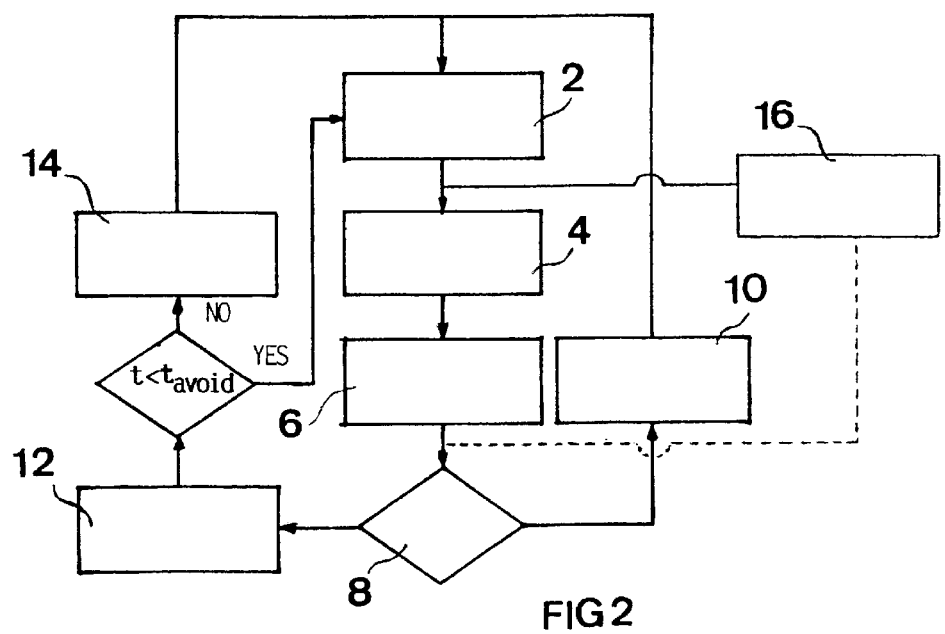
FIG. 2 is a block diagram illustrating a system according to the invention.

FIG. 1 schematically shows two airplanes $F_1$ and $F_2$ flying in the direction towards each other, which airplanes are equipped with a collision avoidance system according to the invention. The airplanes $F_1$ and $F_2$ are provided with means 2 (see FIG. 2) for continuous calculation of their respective future position $P_1$, $P_2$ and means 4 for calculating, co-ordinated between the airplanes $F_1$, $F_2$, a respective avoidance manoeuvre direction $D_i$. Based on this avoidance manoeuvre direction $D_i$ and the calculated future position $P_1$, $P_2$, an avoidance manoeuvre trajectory $Tr_1$, $Tr_2$ for each airplane $F_1$, $F_2$ is calculated by means of a means 6.

In the calculation of the avoidance manoeuvre trajectories $Tr_1$, $Tr_2$ a formula is utilized which can be made more or less complex depending on, inter alia, the accuracy desired in the system and the computer power that can be used. The means 4 utilizes this formula for the calculation of values representing a number of possible avoidance manoeuvre trajectories, with different directions, for the respective airplane $F_1$, $F_2$ in the calculated future position $P_1$, $P_2$. By means of a suitable method, an avoidance manoeuvre direction $D_i$ corresponding to one of the possible avoidance manoeuvre trajectories of the airplane is then determined by a selection among said values. One possible method for this will be described hereinbelow. Based on the obtained avoidance manoeuvre direction $D_i$, the calculating means 6 thereafter calculates the avoidance manoeuvre trajectories $Tr_1$, $Tr_2$ for the airplane by means of said formula.

The respective airplane $F_1$, $F_2$ is also provided with means 8, such as a software module executed by at least one processor, for controlling whether the avoidance manoeuvre trajectory $Tr_1$, $Tr_2$ calculated for the airplane $F_1$, $F_2$ in each moment during its calculated lapse is located at a stipulated or predetermined minimum length distance d from the avoidance manoeuvre trajectories calculated for the other airplanes. If the control shows that this is the case, the data concerning the calculated avoidance manoeuvre trajectory $Tr_1$, $Tr_2$ is stored by means of a suitable storage means 10, whereupon a new future position $P_1$, $P_2$ for the airplane is calculated by the means 2 based on the present position of the airplane and the previous procedure is repeated. If, on the other hand, the control shows that the avoidance manoeuvre trajectory $Tr_1$, $Tr_2$ of the airplane in any moment during its calculated lapse is located at a distance from the avoidance manoeuvre trajectories of any of the other airplanes that is smaller than the stipulated or predetermined minimum distance d, a means 12 is activated, which means 12 warns or communicates to the pilot an existing risk of collision.

The stipulated or predetermined minimum distance d corresponds to a predetermined safety distance $d_{safe}$, possibly supplemented with an error $d_{error}$ corresponding to an estimated maximum error of the calculated avoidance manoeuvre trajectory $Tr_1$, $Tr_2$.

The warning means 12 can be arranged to present the warning in the form of an acoustic signal and/or a light signal. Preferably, the warning means is also arranged to present an appropriate avoidance manoeuvre to the pilot, which avoidance manoeuvre is based on the last stored safe avoidance manoeuvre trajectory $Tr_1$, $Tr_2$. The initial warning is presented a short time before the moment $t_{avoid}$ when an avoidance manoeuvre based on the last stored safe avoidance manoeuvre trajectory $Tr_1$, $Tr_2$ has to be initiated in order to be able to avoid a collision with certainty.

After the initial warning, the system continues to search after a safe avoidance manoeuvre trajectory $Tr_1$, $Tr_2$, in which connection a new future position $P_1$, $P_2$ for the airplane is calculated by the means 2 based on the present position of the airplane and the previous process is repeated. If the control means 8 shows that a new safe avoidance manoeuvre trajectory $Tr_1$, $Tr_2$ has been found, for instance due to the fact that any of the airplanes since the previous cycle of calculation has performed such a manoeuvre that an immediate risk of collision is no longer existing, the warning means 12 is inactivated. In this case, the new safe avoidance manoeuvre trajectory $Tr_1$, $Tr_2$ is stored by the storage means 10 and a new cycle of calculation follows.

If no new safe avoidance manoeuvre trajectory $Tr_1$, $Tr_2$ is found during the warning period, i.e., before the moment $t_{avoid}$, the system executes, via a calculation means 14 an automatic avoidance manoeuvre based on the last stored safe avoidance manoeuvre trajectory $Tr_1$, $Tr_2$. The means 14 is arranged to calculate control parameters based on the stored avoidance manoeuvre trajectory $Tr_1$, $Tr_2$, by means of which control parameters the airplane can be made to perform an avoidance manoeuvre corresponding to the stored avoidance manoeuvre trajectory $Tr_1$, $Tr_2$. The calculation means 14 supplies the calculated control parameters as inputs to the electronic flight manoeuvring system of the airplane, whereby the airplane can be made to perform the desired avoidance manoeuvre. In this connection, the system is adapted in such a way that the automatic avoidance manoeuvre is initiated at the moment $t_{avoid}$, which corresponds to the moment when the airplane is supposed to be in the calculated future position $P_1$, $P_2$ based on which the stored avoidance manoeuvre trajectory $Tr_1$, $Tr_2$ has been calculated.

When the automatic avoidance manoeuvre has been performed, the control of the manoeuvring system of the airplane is returned to the pilot as soon as possible after the situation is safe again.

The means 6 for calculation of the avoidance manoeuvre trajectories $Tr_1$, $Tr_2$ is suitably arranged to make a calculated avoidance manoeuvre trajectory be represented by a number of three dimensional geometrical objects $S_1$–$S_4$, which objects are arranged close to each other along the avoidance manoeuvre trajectory and each of which is assigned a certain time value $T_1$–$T_4$. In this connection, the object $S_1$ represents a volume of space in which the airplane is calculated to be located at the moment $T_1$, and so on. The dimension of the separate objects $S_1$–$S_4$ is adapted taking the safety distance $d_{safe}$ between the avoidance manoeuvre trajectories $Tr_1$, $Tr_2$ into account. In this connection, the control means 8 is arranged to control whether any of the geometrical objects $S_1$–$S_4$ representing the avoidance manoeuvre trajectory $Tr_1$, $Tr_2$ of a vehicle overlaps a geometrical object with corresponding time value included in the representation of the avoidance manoeuvre trajectories of any of the other vehicles.

Figure 3:
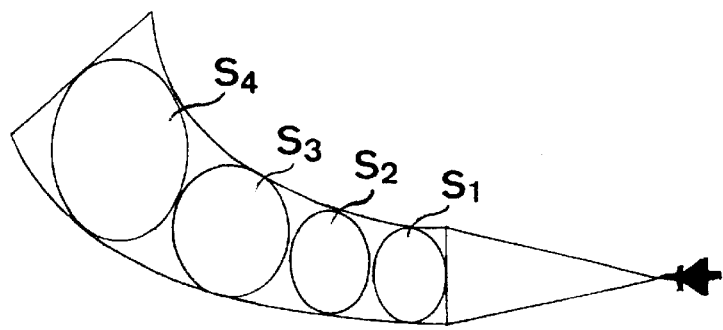
FIG. 3 schematically illustrates an avoidance manoeuvre trajectory calculated for an airplane and represented by geometrical objects in the form of spheres.
Figure 4:
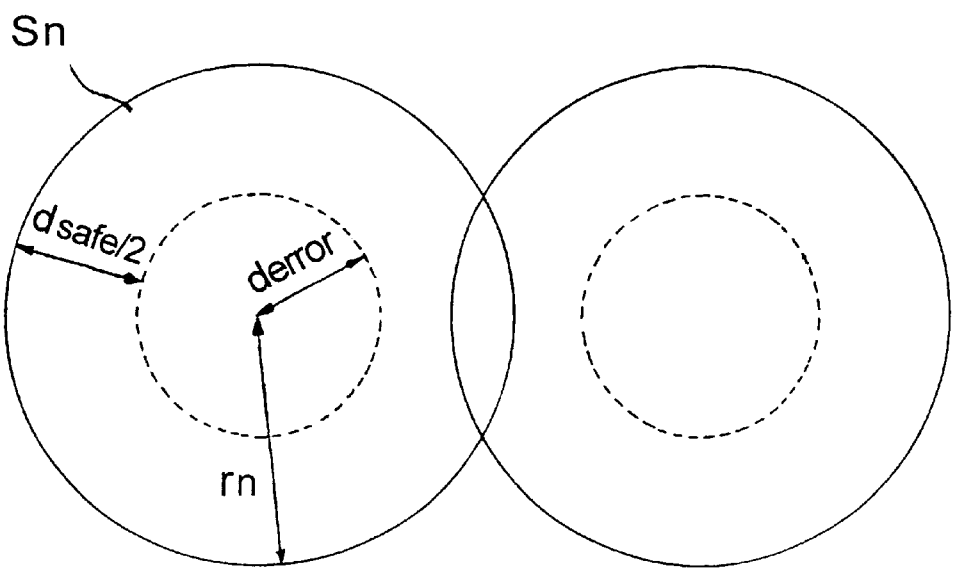
FIG. 4 illustrates two overlapping spheres belonging to the avoidance manoeuvre trajectories of two different vehicles.

The geometrical objects are preferably constituted by spheres, as shown in FIGS. 3 and 4, which gives a simple presentation of the avoidance manoeuvre trajectory since only the centre point, the radius $r_n$ and the time value $T_n$ of the respective sphere $S_n$ has to be determined. The number of spheres $S_n$ in the representation of the respective avoidance manoeuvre trajectory $Tr_1$, $Tr_2$ depends on the radius $r_n$ of the spheres $S_n$ and the length of the avoidance manoeuvre trajectory $Tr_1$, $Tr_2$. In this connection, the radius $r_n$ of the respective sphere $S_n$ corresponds to d/2.

Since there are many sources of error in the calculation of the avoidance manoeuvre directions $D_i$ and the avoidance manoeuvre trajectories $Tr_1$, $Tr_2$, inter alia, due to the unpredictable manoeuvres of the pilot, the avoidance manoeuvre trajectories $Tr_1$, $Tr_2$ should be presented in such a way that the errors in the calculated avoidance manoeuvre direction $D_i$ and avoidance manoeuvre trajectories $Tr_1$, $Tr_2$ do not affect the security of the system. This is suitably achieved in that the calculation means is arranged to adapt the dimension of said geometrical objects $S_1$–$S_4$ taking estimated errors of the respective calculated avoidance manoeuvre trajectory $Tr_1$, $Tr_2$ into account.

In case the objects consist of spheres, the radius $r_n$ of the respective sphere $S_n$ is in this connection determined by two components, the possible error $d_{error}$ and half the safety distance $d_{safe}/2$, i.e. $r_n=d_{safe}/2+d_{error}$. This is illustrated in FIG. 4. In FIG. 4 it also shown how two spheres with the same time values overlap each other. In this case, the system would consequently generate a warning to the pilot. The possible error $d_{error}$ corresponds to the estimated maximum error of the calculated avoidance manoeuvre trajectory $Tr_1$, $Tr_2$. The error of the avoidance manoeuvre trajectory $Tr_1$, $Tr_2$ increases with the distance from its starting point $P_1$, $P_2$ and therefore the spheres $S_n$ will have a larger radius $r_n$ the further away from the starting point $P_1$, $P_2$ they are located, as shown in FIG. 3. The respective sphere $S_n$ represents a volume of space in which the airplane with a certain probability will be located at a certain moment $T_n$.

The calculation of the avoidance manoeuvre trajectories $Tr_1$, $Tr_2$ is performed continuously at discrete moments $t_n$. The time distance between two cycles of calculation has to be so short that two spheres $S_n$ with the same time value $t_n$ belonging to avoidance manoeuvre trajectories $Tr_1$, $Tr_2$ of different airplanes cannot "jump over" each other during the time between two cycles of calculation. Otherwise, two avoidance manoeuvre trajectories could overlap each other without being registered by the system. The maximum time distance between two updatings, i.e. between two cycles of calculation, depends on the relative velocity between the airplanes, the radius $r_n$ of the spheres and the maximum accepted overlapping between two spheres $s_n$. A certain overlapping has to be accepted, since otherwise the time distance between two cycles of calculation would have to be infinitesimal.

Figure 5:
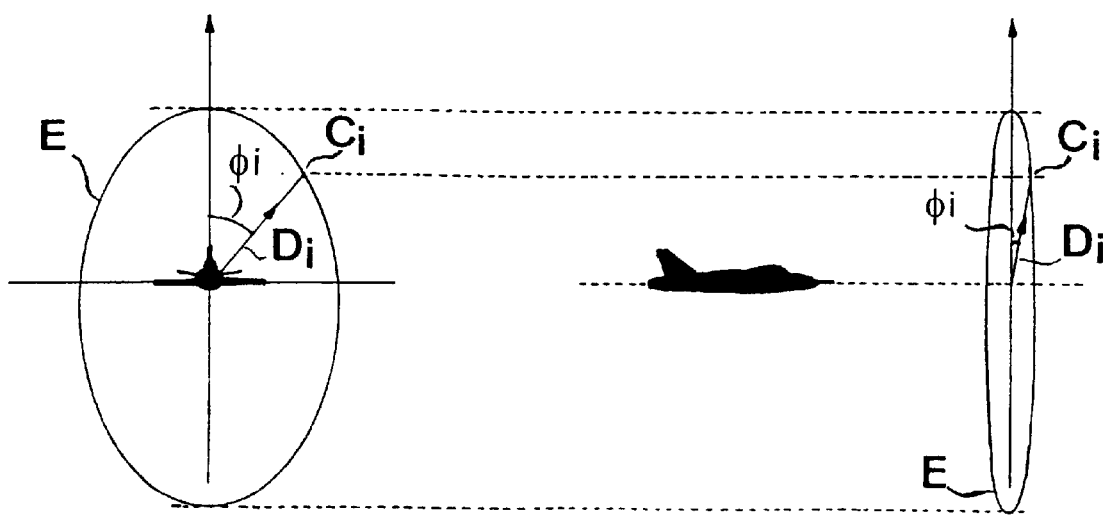
FIG. 5 is a schematic illustration of certain parameters included in a co-ordinated calculation of avoidance manoeuvre directions.

In the above-mentioned calculation of the avoidance manoeuvre directions $D_1$, it is important that the respective avoidance manoeuvre direction is so chosen that the solution to one critical situation of collision does not cause a new such situation. The avoidance manoeuvre directions $D_i$ of the airplanes therefore have to be co-ordinated with each other in some manner. It has appeared suitable to determine the avoidance manoeuvre direction $D_i$ for the respective airplane based on the criteria that the completion point $C_1$ (see FIG. 1) of the respective airplane's avoidance manoeuvre trajectory $Tr_1$ is to be at such a large distance from the completion points of each other avoidance manoeuvre trajectory, such as Tr2, as possible. In this connection, it has also appeared that suitable avoidance manoeuvre directions $D_i$ are obtained by a minimization of the function:

$$f = \sum_{i,j,i\neq j} \frac{1}{\|C_i - C_j\|}$$

where $C_i$ is the completion point of the avoidance manoeuvre trajectory $Tr_i$ for the vehicle i. The function f is consequently the sum of the inverted distance between the completion point $C_i$ of the avoidance manoeuvre trajectories $Tr_1$, $Tr_2$ of all airplanes. The values of $C_i$ are obtained by means of the formula used for the calculation of the avoidance manoeuvre trajectories $Tr_1$, $Tr_2$. In FIG. 5 the possible completion points $C_i$ of the possible avoidance manoeuvre trajectories $Tr_i$ of an airplane based on a certain calculated future position P are represented by an ellipse E.

An avoidance manoeuvre should be as sharp as possible, and therefore the load factor imposed on the airplane during the avoidance manoeuvre should have as large a value as possible. The largest possible load factor can be applied in a direction in parallel with an axis $Z_B$ extending straight up through the airplane (see FIG. 5), At the avoidance manoeuvre, the airplane should therefore suitably have a roll angle $\phi_i$ being such that said axis $Z_B$ is directed in parallel with the avoidance manoeuvre direction $D_i$. The completion point $C_i$ is a function of inter alia the roll angle $\phi_i$ of the airplane at an avoidance manoeuvre based on the calculated avoidance manoeuvre trajectory $Tr_i$, and by minimizing the function f with respect to the roll angle $\phi_i$, which roll angle in accordance with the reasoning above determines the avoidance manoeuvre direction $D_i$, the combination of roll angles $\phi_i$ and thereby avoidance manoeuvre directions $D_i$ that gives the largest possible distance between the completion points $C_i$ of the avoidance manoeuvre trajectories $Tr_i$ of the vehicles is obtained.

The co-ordination of the avoidance manoeuvre directions $D_i$ should be independent of the communication between the airplanes and should consequently be performed separately in all airplanes. In order to avoid complications in case one and the same minimum value of the function f is obtained with several different combinations of values of roll angles $\phi_i$, the system can be adapted such that the means 4 for calculation of the avoidance manoeuvre direction in the respective airplane tests the different roll angle combinations in the same order and selects a certain combination of the possible several combinations that minimizes f according to a fixed priority. By utilizing the same priority in all airplanes, the means 4 in the different airplanes can consequently be made to select one and the same roll angle combination that minimizes the function f.

Figure 6:
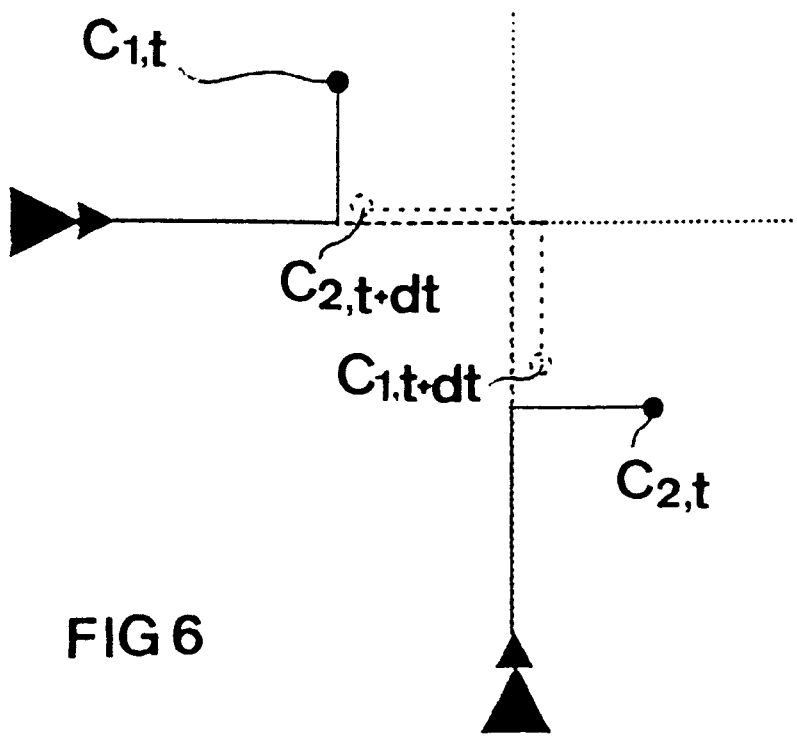
FIG. 6 is a schematic illustration of a collision situation.

The above described method for calculation of avoidance manoeuvre directions could give inappropriate results when the completion point $C_i$ of the avoidance manoeuvre trajectory $Tr_i$ of a first airplane passes the flight path of a second airplane at the same time as, in the same way, the completion point of the avoidance manoeuvre trajectory of the second airplane passes the flight path of the first airplane. This is illustrated in FIG. 6, which shows two airplanes flying towards one and the same point in an angle of 90° in relation to each other. $C_{1,t}$ och $C_{2,t}$ are the completion points of the avoidance manoeuvre trajectory of the respective airplane at the moment t, whereas $C_{1,t+dt}$ och $C_{2,t+dt}$ are the corresponding completion points at the moment t+dt.

Figure 7:
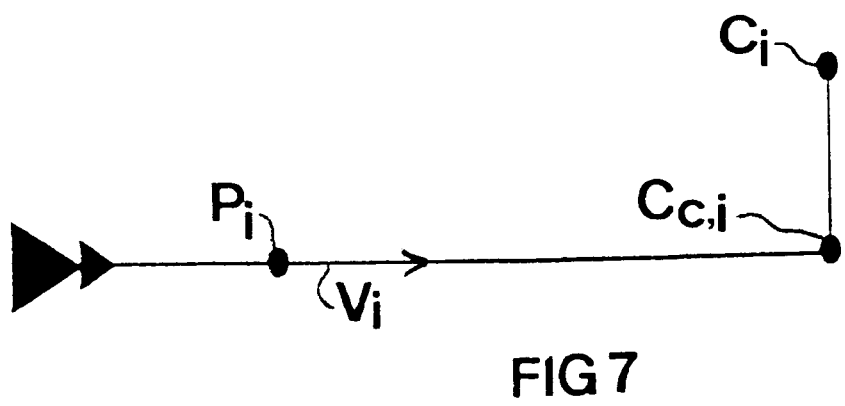
FIG. 7 is a schematic illustration of an auxiliary parameter.

When the respective calculated completion point has passed the respective calculated flight path, the above described method in this specific case gives avoidance manoeuvre trajectories directed towards each other, with a great risk of collision as a result. This problem can be avoided by the introduction of an auxiliary point $C_{c,i}$ (see FIG. 7) and the formation of a condition for the geometry concerning the completion point $C_i$ and this auxiliary point $C_{c,i}$. The auxiliary point according to the shown example is placed in line with the velocity vector $v_i$ of the airplane calculated for the future position $P_i$ in such a way that a right angle is formed between $P_i$, $C_{c,i}$ and $C_i$.

The above mentioned problem arises when $C_i$ is located closer than $C_{c,i}$ to $P_j$ at the same time as $C_j$ is located closer than $C_{c,j}$ to $P_i$. For a situation with n involved airplanes, n conditions are required. Each of these conditions comprises the following two inequalities:

$$\|C_{c,j} - P_i\| < \|C_j - P_i\|$$

$$\|C_{c,i} - P_j\| < \|C_i - P_j\|$$

At least one of these inequalities has to be satisfied for each condition. If the method for calculation of avoidance manoeuvre direction gives a solution that does not satisfy these conditions, this solution is rejected and an alternative solution is calculated.

The collision avoidance system according to the invention requires that each airplane knows the avoidance manoeuvre trajectories calculated for the other airplanes. Furthermore, each airplane needs to have access to data from the other airplanes in order to be able to carry out the co-ordination of the avoidance manoeuvre directions. The calculation of the present and future position, velocity, roll angle etc. for the own airplane is suitably carried out separately in each individual airplane. The values required for subsequent calculations are then communicated to and received from the other airplanes by means of a suitable communication means 16, for instance a radio communication system. The co-ordinated calculation of the avoidance manoeuvre directions is then carried out separately in the respective airplane.

According to a first alternative, the calculation of the avoidance manoeuvre trajectories of all involved airplanes and the comparison control of these avoidance manoeuvre trajectories are thereafter carried out in each individual airplane without any further data communication between the airplanes. According to a second alternative, the respective airplane only calculates its own avoidance manoeuvre trajectory, whereupon data representing the avoidance manoeuvre trajectory of the respective airplane via the communication means 16 is exchanged between the airplanes for the subsequent comparison control of the avoidance manoeuvre trajectories of all airplanes.

The first alternative has the advantage that a relatively small data communication capacity is required, since only a relatively low amount of data has to be communicated between the airplanes. However, a large computer power is required in the individual airplane, since each airplane has to calculate the avoidance manoeuvre trajectories for all airplanes. Therefore, the first alternative is most suited for such systems that utilize a relatively simple model with few parameters for the calculation of the avoidance manoeuvre trajectories. If a more complex model is utilized for the calculation of the avoidance manoeuvre trajectories, the other alternative is to be preferred, since the respective airplane in this case only calculates its own avoidance manoeuvre trajectory.

However, the second alternative requires a larger data communication capacity than the first. The second alternative has the advantage that redundancy is obtained in the system. If an airplane communicates data concerning an avoidance manoeuvre trajectory that turns out to be calculated in another direction than the direction to be expected according to the method for the coordinated calculation of the avoidance manoeuvre directions, an indication is namely obtained that an error has occurred somewhere in the system.

For registration and calculation of present and future position and other parameters that are required for the calculation of avoidance manoeuvre direction and avoidance manoeuvre trajectory, such as present and future roll angle, velocity etc, suitable means and sensors of know type can be used.

The collision avoidance system according to the invention has above been exemplified by an application in pilot manoeuvred airplanes. However, the system is not limited to this application, on the contrary it can be adapted for use in other types of aircrafts, for instance unmanned aircrafts, and can within the scope of the invention also be adapted for use in other types of vehicles besides aircraft. Furthermore, it is possible, if considered suitable in any context, to design the system according to the invention in such a way that an automatic avoidance manoeuvre is executed in case of an established risk of collision without any preceding warning or in such a way that a warning is generated without a subsequent automatic avoidance manoeuvre.

The means 2, 4, 6, 8 and 14 are preferably software modules containing a set of programmable instructions which are capable of being executed by at least one processor for performing the respective functions of each of the means 2, 4, 6, 8 and 14.

What is claimed is:

1. A system for avoidance of collision between vehicles comprising:

means for communicating data to and from a respective vehicle;

means for continuously calculating a future position for the respective vehicle;

means for determining, co-ordinated between the vehicles, an avoidance manoeuvre direction for the respective vehicle;

means for calculating an avoidance manoeuvre trajectory for the respective vehicle based on the calculated future position and avoidance manoeuvre direction for the vehicle;

means for controlling whether the calculated avoidance manoeuvre trajectory in each moment during its calculated lapse is located at a predetermined minimum distance from avoidance manoeuvre trajectories calculated for the other vehicles;

means for storing data concerning the avoidance manoeuvre trajectory of the respective vehicle if the control shows that this trajectory in each moment during its calculated lapse is located at the predetermined minimum distance from the avoidance manoeuvre trajectories of the other vehicles; and means for, in case the control shows that the avoidance manoeuvre trajectory of the respective vehicle in any moment during its calculated lapse is located at a distance from the avoidance manoeuvre trajectory of any of the other vehicles that is smaller than the predetermined minimum distance, communicating a warning to a person manoeuvring the vehicle that a risk of collision exists and/or making the respective vehicle follow an avoidance manoeuvre trajectory previously calculated and stored for the respective vehicle.

2. A system according to claim 1 wherein the system includes said means for continuously calculating said future position of the respective vehicle within the respective vehicle, and wherein the data communication means being arranged to communicate data concerning the calculated future position of the respective vehicle to each of the other vehicles and to receive data from each of the other vehicles concerning the calculated future position of the other vehicles.

3. A system according to claim 1, further comprising means, in the respective vehicle, for automatically making the respective vehicle follow the avoidance manoeuvre trajectory previously calculated and stored for the vehicle, wherein said means for automatically making the respective vehicle follow the avoidance manoeuvre trajectory includes means for calculating control parameters for use by the vehicle for performing an avoidance manoeuvre corresponding to the calculated avoidance manoeuvre trajectory.

4. A system according to claim 1, wherein the means for calculating the avoidance manoeuvre trajectory represents the calculated avoidance manoeuvre trajectory by a number of three dimensional geometrical objects, each object being assigned a certain time value, the dimension of each object being dependent on the predetermined minimum distance between the avoidance manoeuvre trajectory of any of the other vehicles, and that the controlling means being configured to control whether any of the geometrical objects representing the avoidance manoeuvre trajectory of the respective vehicle overlaps a geometrical object with corresponding time value included in the representation of the avoidance manoeuvre trajectory of any of the other vehicles.

5. A system according to claim 4, wherein the calculating means is configured for adapting the dimension of the geometrical objects by taking into account estimated errors ($d_{error}$) of the calculated avoidance manoeuvre trajectory.

6. A system according to claim 1, wherein the means for determining an avoidance manoeuvre direction for the respective vehicle determines the avoidance manoeuvre based on the criteria that the completion points of the avoidance manoeuvre trajectories of the vehicles are to be at as large a distance from each other as possible.

7. A method for avoidance of collision between vehicles, comprising the steps of:
   continuously calculating a future position for a respective vehicle;
   determining an avoidance manoeuvre direction co-ordinated between the vehicles for the respective vehicle;
   calculating an avoidance manoeuvre trajectory for the respective vehicle based on the avoidance manoeuvre direction and the future position calculated for the respective vehicle;
   comparing the avoidance manoeuvre trajectory calculated for the respective vehicle with avoidance manoeuvre trajectories calculated for the other vehicles in order to determine whether the avoidance manoeuvre trajectory of the respective vehicle in each moment during its calculated lapse is located at a predetermined minimum distance from the avoidance manoeuvre trajectories of the other vehicles, wherein if the comparison step determines that the avoidance manoeuvre trajectory of the respective vehicle in each moment during its calculated lapse is located at the predetermined minimum distance from the avoidance manoeuvre trajectories of the other vehicles, data concerning the avoidance manoeuvre trajectory for the respective vehicle is stored, and, if the comparison step determines that the avoidance manoeuvre trajectory of the respective vehicle in any moment during its calculated lapse is located at a distance from an avoidance manoeuvre trajectory of any of the other vehicles that is smaller than the predetermined minimum distance, a warning is communicated to a person manoeuvring the vehicle that a risk of collision exists and/or the vehicle is made to follow the avoidance manoeuvre trajectory previously calculated and stored for the respective vehicle.

8. A method according to claim 7, wherein the avoidance manoeuvre direction for the respective vehicle is determined based on the criteria that the completion points of the avoidance manoeuvre trajectories of the vehicles are to be at as large a distance from each other as possible.

9. A method according to claim 8, wherein the avoidance manoeuvre direction is calculated by minimization of the function $$f = \sum_{i,j, i \neq j} \frac{1}{\|C_i - C_j\|}$$

where $C_i$ represents the completion point of the avoidance manoeuvre trajectory for the respective vehicle i.

10. A method according to claim 7, wherein the future position for the respective vehicle is calculated by calculating means provided in the respective vehicle, and further comprising the steps of:
   communicating from the respective vehicle data regarding the calculated future position of the respective vehicle to each of the other vehicles; and
   receiving by the respective vehicle from each of the other vehicles receives data regarding the calculated future position of each of the other vehicles.

11. A method according to claim 7, further comprising the step of representing the calculated avoidance manoeuvre trajectory of the respective vehicle by a number of three dimensional geometrical objects, each object being assigned a certain time value, the dimension of each object being dependent on the predetermined minimum distance between the avoidance manoeuvre trajectories, and that it is determined during the comparison step whether any of the geometrical objects representing the avoidance manoeuvre trajectory of the respective vehicle overlaps a geometrical object with corresponding time value included in the representation of the avoidance manoeuvre trajectory of any of the other vehicles.

12. A method according to claim 11, wherein the dimension of the geometrical objects is determined by taking estimated errors ($d_{error}$) of the calculated avoidance manoeuvre trajectory ($Tr_1$, $Tr_2$) into account.

* * * * *

UNITED STATES PATENT AND TRADEMARK OFFICE
CERTIFICATE OF CORRECTION

PATENT NO.   : 6,510,388 B1
DATED        : January 21, 2003
INVENTOR(S)  : Sporrong et al.

It is certified that error appears in the above-identified patent and that said Letters Patent is hereby corrected as shown below:

<u>Title page,</u>
Insert:

--   [30]  Foreign Application Priority Data

9904717-7 (SE)    Sweden    December 22, 1999
     PCT/SE00/02467                December 8, 2000 --

Signed and Sealed this

Twentieth Day of May, 2003

JAMES E. ROGAN
*Director of the United States Patent and Trademark Office*